(12) United States Patent
Kampondeni

(10) Patent No.: US 9,010,808 B2
(45) Date of Patent: Apr. 21, 2015

(54) SUPPLEMENTAL RESTRAINT SYSTEM AND ASSOCIATED METHODS

(71) Applicant: Samuel D. Kampondeni, Blantrye (MW)

(72) Inventor: Samuel D. Kampondeni, Blantrye (MW)

(*) Notice: Subject to any disclaimer, the term of this patent is extended or adjusted under 35 U.S.C. 154(b) by 0 days.

(21) Appl. No.: 13/803,332

(22) Filed: Mar. 14, 2013

(65) Prior Publication Data

US 2014/0265287 A1 Sep. 18, 2014

(51) Int. Cl.
*B60R 22/28* (2006.01)
*B60R 22/00* (2006.01)

(52) U.S. Cl.
CPC ........... *B60R 22/00* (2013.01); *B60R 2022/006* (2013.01)

(58) Field of Classification Search
CPC .... B60R 22/00; B60R 22/28; B60R 2022/006
USPC ............... 280/801.1, 805, 808; 297/468, 470, 297/471, 472, 482
See application file for complete search history.

(56) References Cited

U.S. PATENT DOCUMENTS

| | | | | |
|---|---|---|---|---|
| 2,994,890 A * | 8/1961 | Wagner | ............................... | 5/718 |
| 3,142,515 A * | 7/1964 | Wall et al. | ................. | 297/452.51 |
| 3,361,475 A * | 1/1968 | Villiers | .......................... | 297/472 |
| 4,619,468 A * | 10/1986 | Spill | ........................... | 280/801.1 |
| 4,699,401 A * | 10/1987 | Saenz | ............................ | 280/808 |
| 4,741,574 A * | 5/1988 | Weightman et al. | ........ | 280/801.1 |
| 4,786,080 A * | 11/1988 | Jay | ................................. | 280/808 |
| 4,958,394 A * | 9/1990 | Urai et al. | ....................... | 5/654.1 |
| 5,114,185 A * | 5/1992 | Reedom | ........................ | 297/482 |
| 5,161,824 A * | 11/1992 | Li | .................................. | 280/808 |
| 5,233,711 A * | 8/1993 | Urai et al. | ....................... | 5/655.7 |
| 5,584,536 A | 12/1996 | White | | |
| 5,620,234 A * | 4/1997 | Gunby | .......................... | 297/482 |
| 5,664,843 A * | 9/1997 | Gleason | ........................ | 297/482 |
| 6,273,647 B1 * | 8/2001 | Vande Sande et al. | ......... | 406/41 |
| 6,382,730 B1 * | 5/2002 | Closner | ......................... | 297/482 |
| 6,409,271 B1 * | 6/2002 | Caramanis | .................... | 297/482 |
| 7,121,628 B2 | 10/2006 | Lo | | |
| 7,318,606 B1 | 1/2008 | Berke | | |
| 2004/0039316 A1 * | 2/2004 | Smith | ................................ | 602/6 |
| 2012/0205960 A1 * | 8/2012 | Finch | ............................. | 297/470 |

* cited by examiner

*Primary Examiner* — Paul N Dickson
*Assistant Examiner* — Robert A Coker
(74) *Attorney, Agent, or Firm* — Mark R. Malek; Daniel C. Pierron; Widerman Malek, PL

(57) ABSTRACT

A supplemental restraint system comprises a channel adapted to receive a seat belt, a first flange adapted to retain the seat belt formed on a first edge of the channel, a second flange adapted to retain the seat belt formed on a second edge of the channel opposite the first edge, and a pad connected to a bottom surface of the channel. The pad may have an internal compartment adapted to contain a pressurized fluid or may have a compressive element disposed therein. The pad may have a width between two-times and four-times a width of the seat belt. The supplemental restraint system may be deployed, both in a shoulder restraint segment of the seat belt and in a lap belt segment of the seat belt.

6 Claims, 6 Drawing Sheets

SUPPLEMENTAL RESTRAINT SYSTEM AND ASSOCIATED METHODS

FIELD OF THE INVENTION

The present invention relates to the field of vehicular safety systems and, more specifically, to the field of supplemental restraint systems and associated methods.

BACKGROUND OF THE INVENTION

It is commonly known that vehicular collisions, and other hazardous conditions involving the operation of vehicles, cause tens of thousands of injuries and fatalities each year. It is also commonly known that oftentimes the only injury suffered in a vehicular collision, or other hazardous operating condition, is the direct result of contact with the seat belt, air bag or other restraint system intended to safeguard the occupants of the vehicle. From bruising, to fractured ribs, to internal hemorrhaging, to brain damage, to death; the injuries resulting from the use of seat belts, air bags and other safety devices in a vehicular collision, or other hazardous operating condition, can range from minor to catastrophic.

There are numerous devices that have attempted to provide a restraint system that safeguards the occupants of a vehicle from injury in the event of a collision or other hazardous operating condition. For example, U.S. Pat. No. 5,584,536 to White discloses a seat belt cushioning device adapted to be positioned over the shoulder restraint portion of an existing seat belt of a vehicle. The seat belt cushioning device comprises an elongated air bladder with an air valve, an elongated cushion and a number of elongated ribs. An upper surface of the cushion is secured to a lower surface of the air bladder. The elongated ribs are secured to a lower surface of the cushion. The elongated ribs are oriented toward the chest of a user. Opposing sets of straps are secured to opposite sides of a peripheral edge of the air bladder to secure the cushion device to the seat belt.

U.S. Pat. No. 5,114,185 to Reedom discloses seat belt cushions in the form of people, places, things, birds, animals and insects. The seat belt cushions are constructed of one or more sheets of foam padding encased by a cotton or synthetic fiber outer layer. In a preferred embodiment, lighting effects and audio output may be employed by the seat belt cushions. The seat belt cushions are secured to a seat belt by folding around the seat belt, much in the nature of a book. In one embodiment, the foam padding is provided with a hollowed-out area which can be sealed and filled with a gaseous material, or can be filled with an additional fiber or foam material.

U.S. Pat. No. 7,121,628 to Lo discloses a belt pressure reduction device comprising a planar structure folded upon itself and an air cushion including an air bag and an air inflation unit. A combining portion is formed in the planar structure by folding two sides of the planar structure so that one side covers upon another side to form an adhering section. A hollow receiving space is formed within the combining portion for receiving the air cushion and a belt. A user inflates the air bag by use of the air inflation unit.

U.S. Pat. No. 7,318,606 to Berke discloses a seat belt cushion comprising a resilient soft elongated cushion having tapered end portions, a length sufficient to span a groin region of a pregnant woman below a fetal abdominal bulge, a width near or about the width of a safety belt, and a thickness sufficient to prevent discomfort to a pregnant woman. In a first embodiment, the soft resilient cushion has a cellular polymer core, a cover for enclosing the core and a pair of straps for attaching the comfort cushion to a restraint system belt. In a second embodiment, the comfort cushion is an inflatable cushion with a pair of straps for attaching the comfort cushion to a restraint system belt. In a third embodiment, the comfort cushion is an integral part of a restraint system belt.

There exists a need to provide a supplemental restraint system that protects the occupants of a vehicle from injury in the event of a vehicular collision or other hazardous condition involving the operation of a vehicle, so as to eliminate some of the shortcomings inherent in the prior art.

SUMMARY OF THE INVENTION

Such needs are addressed in the present invention. The supplemental restraint system of an embodiment of the present invention advantageously may provide enhanced protection, both in a shoulder restraint segment of a seat belt and in a lap belt segment of the seat belt, to an occupant of a vehicle wearing the seat belt in the event of a collision or other hazardous driving condition. An embodiment of the present invention also advantageously provides a supplemental restraint system that may spread the restraining force of the seat belt along a wider portion of the chest wall and/or lap of the seat belt wearer in the event of a collision or other hazardous driving condition. The supplemental restraint system according to an embodiment of the present invention further advantageously may provide an interior surface with a raised section thicker than the compressive element within the device so as to eliminate the possibility of any direct contact between the seat belt wearer and the compressive element within the device.

These and other objects, features and advantages according to an embodiment of the present invention are provided by a supplemental restraint system that may comprise a channel adapted to receive a seat belt and a pad connected to a bottom surface of the channel. The channel may be formed from plastic. The channel may have a first edge and a second edge opposite the first edge. The first edge may have a first flange formed therein. The second edge may have a second flange formed therein. The first flange and the second flange may each be adapted to retain a portion of the seat belt and may be formed from plastic.

The pad may have a width between about 2-times and 4-times a width of the seat belt. The pad may be formed from rubber. The pad may have an internal compartment adapted to contain a pressurized fluid. The pressurized fluid contained within the internal compartment may be selected from the group consisting of a gas, a liquid and a gel. The pad may be covered with a fabric. In another embodiment of the present invention, the pad may have an internal compartment with a compressive element disposed therein. The compressive element may be selected from the group consisting of a high density foam and at least one spring. The at least one spring may be disposed between a bottom surface of the channel and an inner surface of the pad. The inner surface of the pad may have at least one raised inner surface section with a thickness at least 0.5 cm thicker than a decompressed height of the at least one spring.

A method aspect according to an embodiment of the present invention may be for using the supplemental restraint system. The method may comprise passing a seat belt within the first flange, passing the seat belt within the second flange, receiving the seat belt in the channel, and orienting the pad toward an occupant of a vehicle occupying a seat associated with the seat belt.

DETAILED DESCRIPTION OF THE PREFERRED EMBODIMENT

Figure 1:
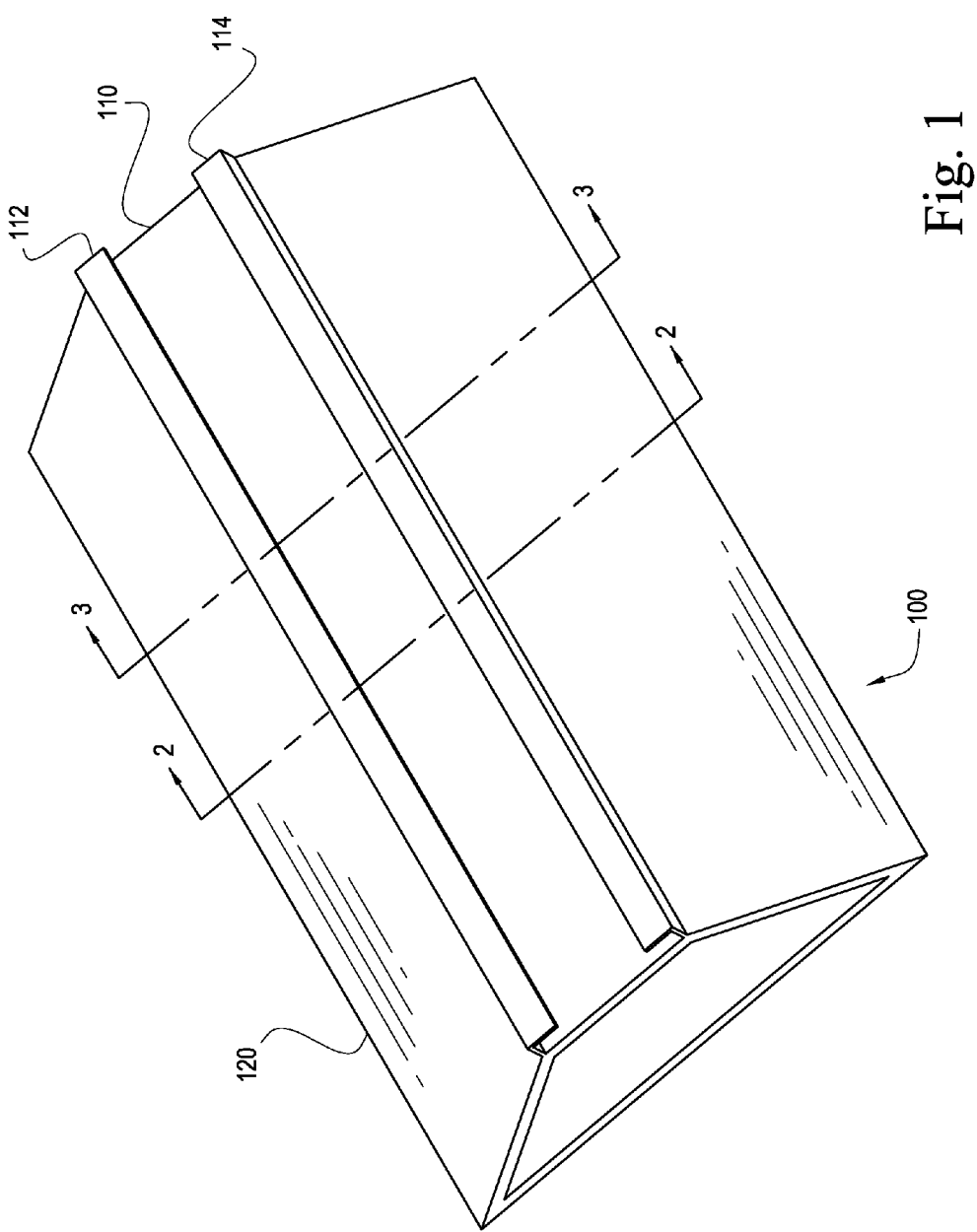
FIG. 1 is a perspective view of a supplemental restraint system according to an embodiment of the present invention.

The present invention will now be described fully hereinafter with reference to the accompanying drawings, in which preferred embodiments of the invention are shown. Like numbers refer to like elements throughout. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art will realize that the following embodiments of the present invention are only illustrative and are not intended to be limiting in any way. Other embodiments of the present invention will readily suggest themselves to such skilled persons having the benefit of this disclosure.

A supplemental restraint system 100 according to an embodiment of the present invention can advantageously provide a safer restraint system for the occupants of a vehicle in the event of a collision or other hazardous driving condition. More specifically, the supplemental restraint system 100 according to an embodiment of the present invention may advantageously reduce injuries resulting from the contact between an occupant of a vehicle and the traditional restraint systems deployed in the event of a collision or other hazardous driving condition. This is accomplished by providing a supplemental restraint system 100 including a wider area of restraining force application combined with a cushioning portion as illustrated, for example, in FIGS. 2-4. Additionally, the supplemental restraint system 100 according to an embodiment of the present invention can advantageously be deployed in a shoulder restraint portion and/or in a lap belt portion.

Referring now to FIGS. 1-5, general details of the supplemental restraint system 100 according to an embodiment of the present invention are now described. As will be discussed in greater detail below, the unique design of the supplemental restraint system 100 includes a channel 110, and a pad 120. The channel 110 may have a first flange 112 on a first edge thereof, and a second flange 114 on a second edge thereof opposite the first flange. The pad 120 may be connected to a bottom surface of the channel 110. The pad 120 may have an internal compartment 130 adapted to contain a pressurized fluid. In another embodiment of the present invention, the pad may have an internal compartment 130 with a compressive element disposed therein. The pad 120 may have a width between two-times and four-times a width of a seat belt 170.

Individual portions of the supplemental restraint system 100 according to an embodiment of the present invention will now be discussed in greater detail. As depicted in FIG. 1, in one embodiment of the supplemental restraint system 100, a channel 110 may be connected to a pad 120 along a bottom surface of the channel. The channel 110 may be adapted to receive a seat belt 170. The channel 110 may have a first edge and a second edge opposite the first edge. A first flange 112 may be formed in the first edge and a second flange 114 may be formed in the second edge. The first flange 112 and the second flange 114 may be adapted to retain a portion of the seat belt 170. The channel 110 may be formed from plastic. The first flange 112 and the second flange 114 may be formed from plastic. The pad 120 may have a width between two-times and four-times a width of the seat belt 170. The pad 120 may be formed from rubber. Those skilled in the art, however, will appreciate that the channel 110, the first flange 112 and the second flange 114 being formed of a plastic material is the preferred embodiment of the invention, but that these portions of the restraint system 100 may be formed of any other material while still carrying out the features, advantages and objectives of the present invention. For example, the channel 110, the first flange 112 and the second with 14 may be formed of a composite material, a soft metal material, or any other type of material having similar properties. Similarly, the pad 120 may also be formed of any other material having similar properties as a rubber material. Those skilled in the art will appreciate that disclosure of the pad 120 being made of a rubber material is meant to be exemplary in nature and not to be limiting in any way.

Figure 2:
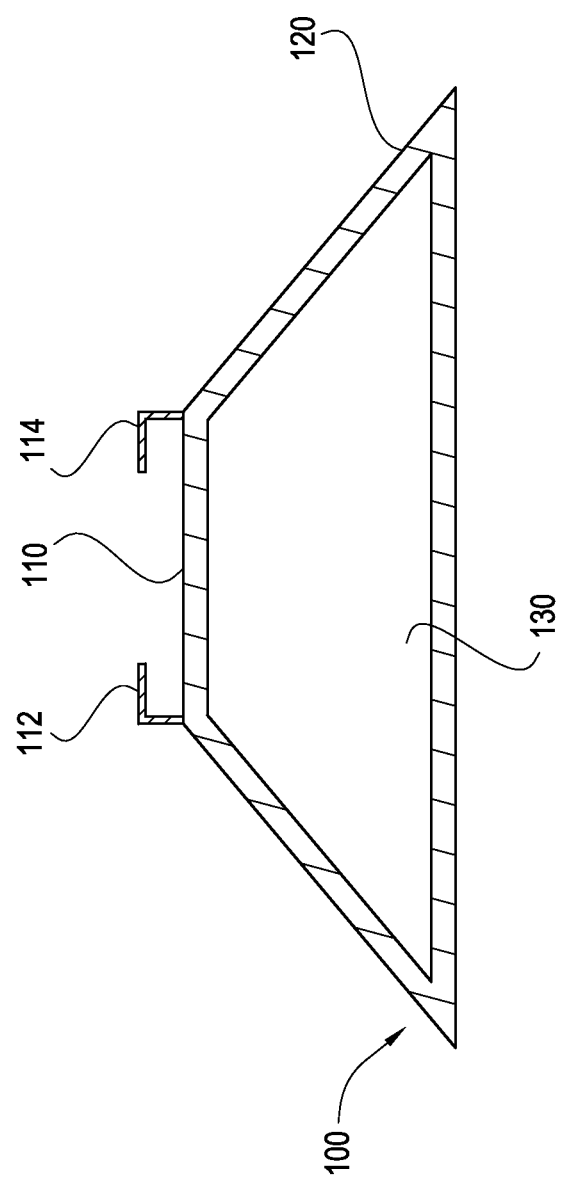
FIG. 2 is a latitudinal cross sectional view of the supplemental restraint system illustrated in FIG. 1 and taken through line 2-2.
Figure 3A:
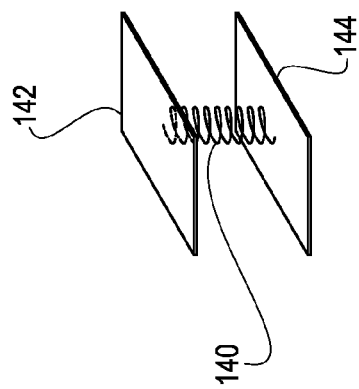
FIG. 3A is a perspective view of a spring as illustrated in the cross sectional view of FIG. 3.
Figure 3:
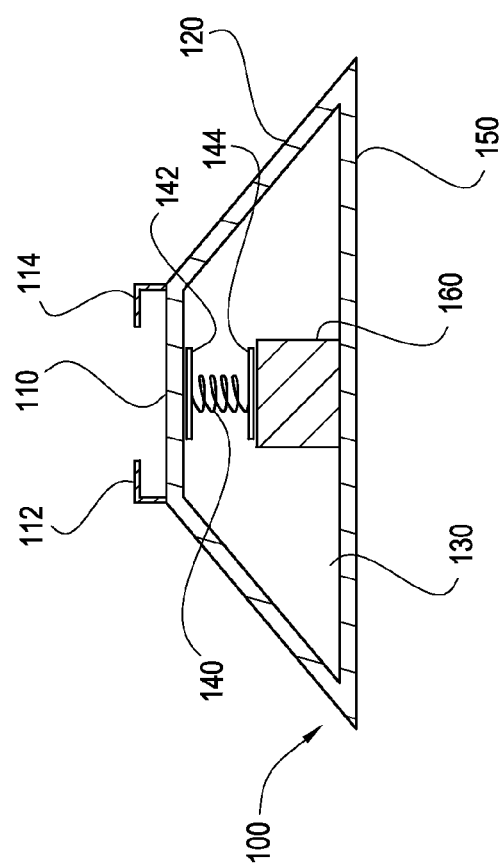
FIG. 3 is a longitudinal cross sectional view of the supplemental restraint system according to another embodiment of the present invention illustrated in FIG. 1 and taken through line 3-3.
Figure 4:
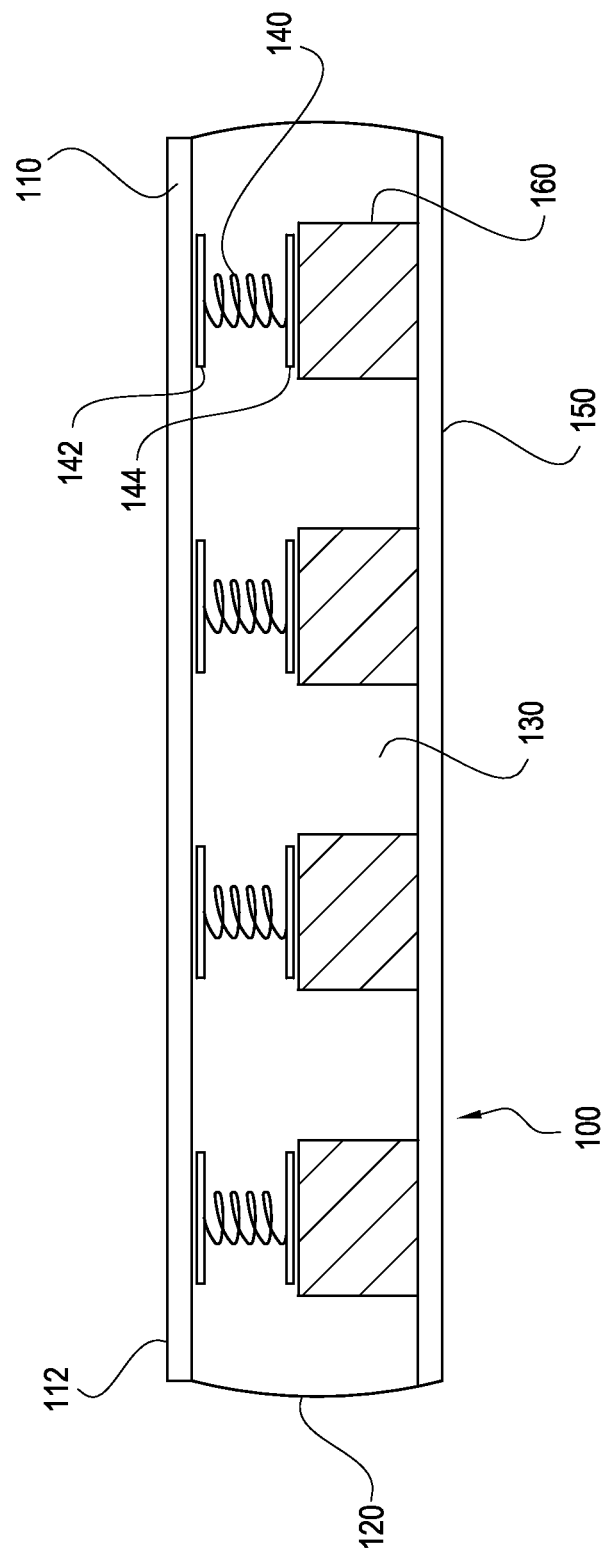
FIG. 4 is an elevation view of an inner portion of the supplemental restraint system illustrated in FIG. 3 and showing a plurality of springs.

After having had the benefit of reading this disclosure, those skilled in the art will appreciate that the channel 110, while depicted in FIG. 1 as being recessed within the pad 120, could also be disposed on a top surface of the pad (as depicted in FIGS. 2, 3 and 4) or at any depth within the pad while still accomplishing the goals, features and objectives according to the present invention. Likewise, those skilled in the art will also appreciate that while the first flange 112 and the second flange 114 are depicted in FIG. 1 as being substantially planar and as being disposed substantially perpendicular to the first edge and the second edge, the first flange and the second flange could be disposed at an angle of forty-five degrees (45%) from the respective edge or at any angle and could be curvilinear or take on any shape. Similarly, those skilled in the art will appreciate that the present invention contemplates the use of rubber or other suitable material for the channel 110, the first flange 112 and the second flange 114. Furthermore, and as described in greater detail above, those skilled in the art will also appreciate that the pad may be formed from latex, foam or other suitable soft and force-absorbing material.

Figure 5:
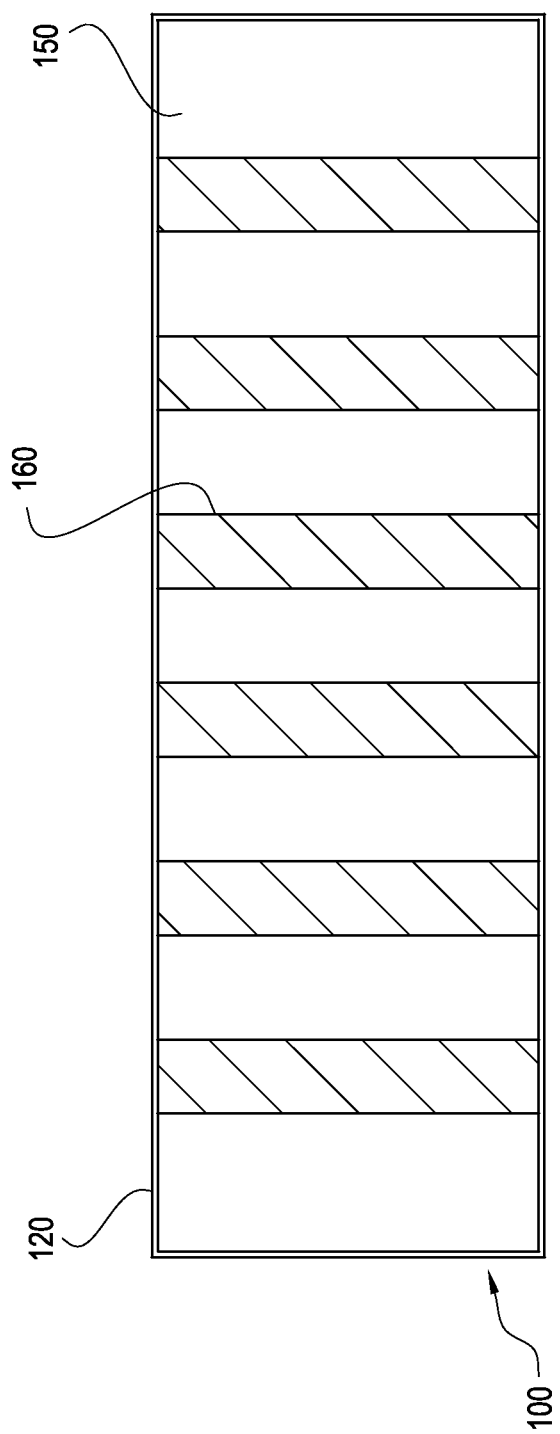
FIG. 5 is a top view of an inner surface of the pad of the supplemental restraint system illustrated in FIG. 3.

As depicted in FIG. 2, the pad 120 according to an embodiment of the present invention may have an internal compartment 130 adapted to contain a pressurized fluid. The pressurized fluid may be selected from the group consisting of a gas, a liquid and a gel. A gas is preferred due to its light weight. As depicted in FIG. 3, the pad 120 according to another embodiment of the present invention may have an internal compartment 130 adapted to contain a compressive element. The compressive element may be selected from the group consisting of a high density foam and at least one spring 140. Use of high density foam may be advantageous as it will allow for the restraint system 100 to be compressed where a seatbelt is held within the channel 110. The at least one spring 140 may be disposed between a bottom surface of the channel and an inner surface of the pad 150. The at least one spring 140 may have a high strength to weight ratio, allowing it to absorb a great amount of force while still being light in weight. Similarly, use of at least one spring 140 may also allow for the restraint system 100 to be compressed where a seatbelt is held within the channel 110. The inner surface of the pad 150 may have at least one raised inner surface section 160 with a thickness at least 0.5 cm thicker than a decompressed height of the at least one spring 140. As perhaps best illustrated in FIG. 3A, the at least one spring 140 may be connected at a top end thereof to a top retaining plate 142 and may be connected at a bottom end thereof to a bottom retaining plate 144. The top retaining plate 142 and the bottom retaining 144 plate may be formed from metal. The top retaining plate 142 may be connected to the bottom surface of the channel. The bottom retaining plate 144 may be connected to the raised inner surface section 160 of the inner surface of the pad 150. As depicted in FIGS. 4 and 5, the at least one raised inner surface section 160 may be provided along a length of the pad 120. As depicted in FIG. 5, the at least one raised inner surface section may extend laterally across a width of the pad 120.

After having had the benefit of reading this disclosure, those skilled in the art will appreciate that the at least one spring 140, while depicted in FIG. 3 as being provided by one spring, may be provided by four springs (as depicted in FIG. 4) or by any number of springs while still accomplishing the goals, features and objectives according to the present invention. Likewise, those skilled in the art will appreciate that the at least one raised inner surface section 160, while depicted in FIG. 3 as being provided by one raised inner surface section, may be provided by four raised inner surface sections (as depicted in FIG. 4), by six raised inner surface sections (as depicted in FIG. 5) or by any number of raised inner surface sections. Preferably, the at least one spring 140 will be provided by a number of springs that corresponds with the number of at least one raised inner surface sections 160 (as depicted in FIG. 4). Similarly, those skilled in the art will also appreciate that the at least one raised inner surface section 160, while depicted in FIGS. 4 and 5 as being oriented in a lateral manner, may be oriented in a longitudinal manner, in a diagonal manner or in any other manner.

Figure 6:
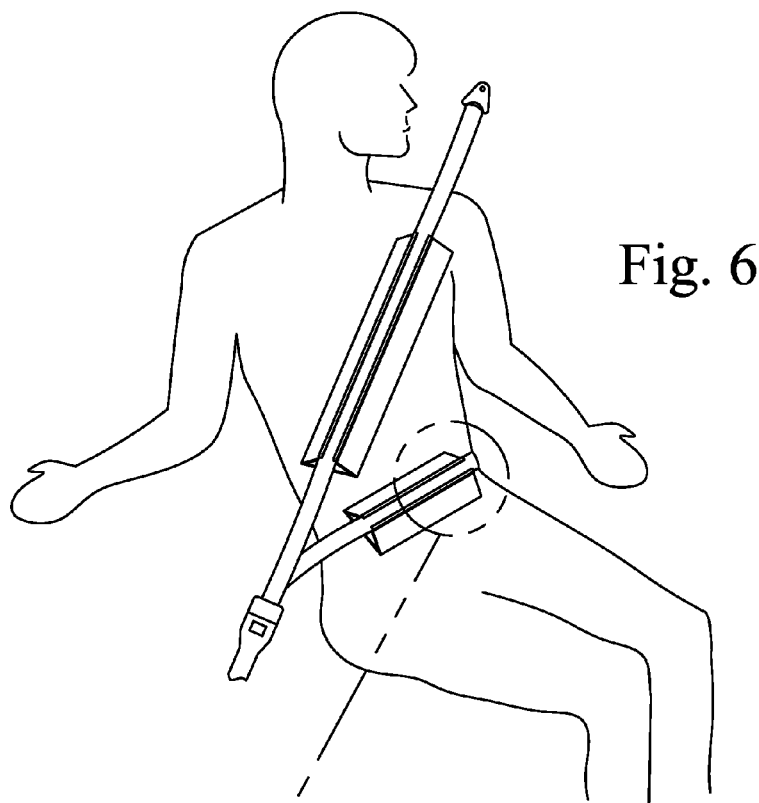
FIG. 6 is a perspective view of an occupant of a vehicle using the supplemental restraint system illustrated in FIG. 1, deployed in both a shoulder restraint section of a seat belt and a lap belt section of the seat belt.
Figure 6A:
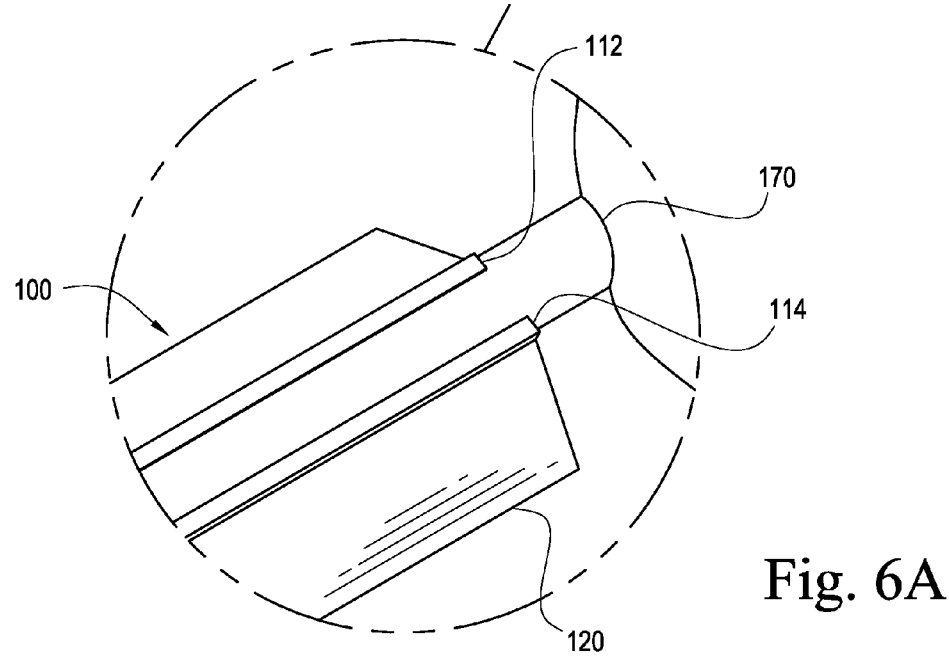
FIG. 6A is a detail of the supplemental restraint system illustrated in FIG. 6 deployed in the lap belt section of the seat belt.

As depicted in FIG. 6, the supplemental restraint system 100 according to an embodiment of the present invention can be deployed in a shoulder restraint section of the seat belt 170 and in a lap belt section of the seat belt. As perhaps best illustrated in FIG. 6A, the supplemental restraint system 100 according to an embodiment of the present invention is deployed with the pad 120 oriented toward a user and with the seat belt 170 received in the channel 110 (obscured by the seat belt) and retained within the first flange 112 and the second flange 114. After having the benefit of reading this disclosure, those skilled in the art will appreciate that the increased width of the pad 120, relative to the width of the seat belt 170, provides additional surface area to spread the force applied against the user by the seat belt in the event of a collision or other hazardous driving condition. Likewise, those skilled in the art will appreciate that the inner chamber 130 adapted to contain a pressurized fluid according to an embodiment of the present invention disposed between a user and the seat belt 170 will provide a cushioning effect in the event of a collision or other hazardous driving condition. Similarly, those skilled in the art will also appreciate that the inner chamber 130 adapted to contain a compressive element according to another embodiment of the present invention disposed between a user and the seat belt 170 will also provide a cushioning effect in the event of a collision or other hazardous driving condition.

A method is provided for using a supplemental restraint system 100, including a channel adapted to receive a seat belt, a first flange adapted to retain the seat belt formed on a first edge of the channel, a second flange adapted to retain the seat belt formed on a second edge of the channel opposite the first edge, and a pad connected to a bottom surface of the channel, according to an embodiment of the present invention. The method may comprise passing the seat belt within the first flange, passing the seat belt within the second flange, receiving the seat belt within the channel, and orienting the pad toward an occupant of a vehicle occupying a seat associated with the seat belt. A method is also provided for using a supplemental restraint system 100, according to another embodiment of the present invention, including a pad having an internal compartment adapted to contain a pressurized fluid selected from the group consisting of a gas, a liquid and a gel or a compressive element selected from the group consisting of a high density foam and at least one spring.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed.

That which is claimed is:

1. A supplemental restraint system comprising:
   a channel adapted to receive a seat belt, the channel having a first edge and a second edge opposite the first edge; and
   a pad connected to a bottom surface of the channel, the pad having an internal compartment with at least one spring disposed therein;
   wherein an inner surface of the pad has at least one raised inner surface section with a thickness at least 0.5 cm thicker than a decompressed height of the at least one spring;
   wherein a first flange adapted to retain a portion of the seat belt is formed in the first edge and a second flange adapted to retain a portion of the seat belt is formed in the second edge.

2. The supplemental restraint system of claim 1 wherein the channel is formed from plastic.

3. The supplemental restraint system of claim 1 wherein the pad is formed from rubber.

4. The supplemental restraint system of claim 1 wherein the pad has a width between 2-times and 4-times a width of the seat belt.

5. The supplemental restraint system of claim 1 wherein the pad is covered with a fabric.

6. The supplemental restraint system of claim 1 wherein the first flange and the second flange are formed from plastic.

* * * * *